Figure 1:
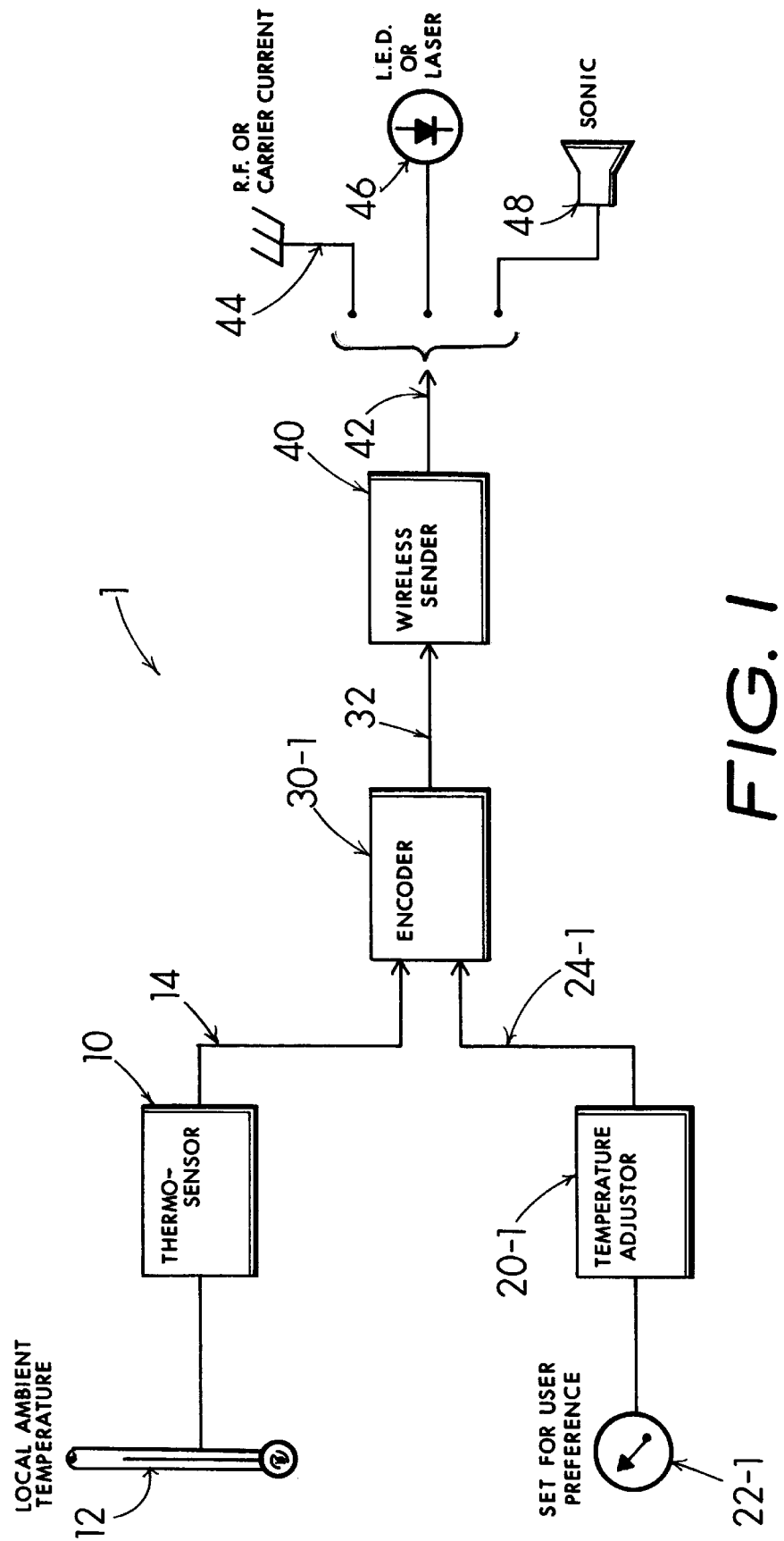

United States Patent [19]
Weber

[11] Patent Number: 5,839,654
[45] Date of Patent: Nov. 24, 1998

[54] PORTABLE AIR COMFORT SYSTEM THERMOSTAT ENABLING PERSONAL LOCALIZED CONTROL OF ROOM TEMPERATURE

[75] Inventor: Harold J. Weber, Holliston, Mass.

[73] Assignee: Innova Patent Trust, Centerville, Mass.

[21] Appl. No.: 596,457

[22] Filed: Feb. 5, 1996

[51] Int. Cl.[6] .............................. G05D 23/00; F23N 5/20
[52] U.S. Cl. ................................................. 236/47; 236/51
[58] Field of Search ................................... 236/51, 646.1, 236/47; 165/268; 62/231

[56] References Cited

U.S. PATENT DOCUMENTS

| | | | |
|---|---|---|---|
| 3,159,212 | 12/1964 | Patrick | 165/267 X |
| 3,785,165 | 1/1974 | Valenzuela, Jr. | 62/262 X |
| 4,557,317 | 12/1985 | Harmon, Jr. | 236/46 R |
| 4,585,164 | 4/1986 | Butkovich et al. | 236/51 |
| 4,776,179 | 10/1988 | Ta | 236/51 X |
| 5,272,477 | 12/1993 | Tashima et al. | 236/51 X |
| 5,299,430 | 4/1994 | Tsuchiyama | 236/51 X |
| 5,326,027 | 7/1994 | Sulfstede | 236/51 |
| 5,590,831 | 1/1997 | Manson et al. | 236/51 |

*Primary Examiner*—William E. Wayner

[57] ABSTRACT

Wireless control of an air conditioner or space heater by a portable, easily relocatable remote thermostat combined with a control signal transmitter which is placed on a table, desk or stand near an occupant of a room or office to set the operation of a cooling or heating source in order to maintain a more uniform level of air temperature comfort in the portion of the room where the thermostat is located. A wireless control receiver responsive to the transmitted control signal is included as a portion of a plug-in adapter module that plugs directly into an AC power wall receptacle. An ordinary window air conditioner or portable space heater is then merely plugged into the adapter module which provides ON and OFF control in response to the remote thermostat. A receiver is inclusible in a fixed-location wall thermostat, enabling the portable remote thermostat to maintain control of a centralized climate control system.

20 Claims, 8 Drawing Sheets

PORTABLE AIR COMFORT SYSTEM THERMOSTAT ENABLING PERSONAL LOCALIZED CONTROL OF ROOM TEMPERATURE

FIELD OF MY INVENTION

My invention relates to wireless thermostatic control of localized air comfort level produced by room air conditioning and space heating. For purpose of this invention, I intend "air conditioning" to have a broadest meaning of "a system that controls or reduces the temperature and humidity of the air in an office, dwelling, etc." (The Random House College Dictionary, Random House Inc., New York; ISBN 0-394-43600-8; pp 29) and "to equip (as a building) with an apparatus for washing air and controlling its humidity and its temperature" and "to subject (air) to these. processes" (Webster's New Collegiate Dictionary, G&C Merriam Co., Spring-field, Mass.; ISBN 0-87779-348-2; pp 25 "air condition"). Therefore, for purpose of this invention the term "climate control source" or "climate control system" refers to a "Heating, Ventilating and Air Conditioning" system (known in the trade as HVAC) and broadly means any source of air conditioning and/or space heating of an enclosed area which is or might be advantageously controlled by a temperature responsive electrical thermostat. Furthermore, I intend the term "wireless" to find meaning under the Random House College Dictionary to literally mean "2.noting or pertaining to any of various devices that are operated with or operated by electromagnetic waves" further in view of the electromagnetic wave spectrum lying between at least 10-kilohertz and 1,000 terahertz. ("Reference Data for Radio Engineers", 5th Ed.1968, Lib. Cong. No.43-14665). The term wireless is to further include sonic (acoustic and ultrasound) signals between about 1-kilohertz and 100-kilohertz.

BACKGROUND OF MY INVENTION

In ordinary room air conditioning systems which are widely used in homes and offices, a considerable temperature differential may occur between one area and another area within the cooled space. Window mounted room air conditioners are frequently installed at a considerable distance away from the room occupant's principal location. This might be due to a noise consideration (since room air conditioners tend to be quite noisy and annoying) or merely due to an availability of (or preference for) a particular window opening. In an office setting this might mean that a person's work station or desk is located at a disadvantageous distance from the air conditioner with the result that uniform temperature control in the immediate vicinity of the desk is difficult to maintain throughout the workday. In a home setting, a room air conditioner might be located in a window far from an occupied portion of the room, thereby producing an aggravating difficulty in maintaining a stable comfort level in the occupant's immediate room space.

In construction of the usual semiportable (window style) room air conditioner (i.e., Whirlpool ACQ082X, Westinghouse WAC067W7A), temperature control afforded to a room is ordinarily determined by a local control thermostat (such as a Ranco model C12-5010) usually situated in the air-flow path (typically, near the inlet or return air duct) and therefore the control thermostat is merely capable of maintaining or controlling the ambient air temperature of surrounding air in the immediate vicinity of the air conditioner. The control thermostat has no way of sensing changes in temperature which might ordinarily occur in another more distant part of a room where human occupancy might actually occur.

A particularly bothersome example of this situation occurs where the air conditioner has been installed in a far corner of an office relative with an office worker who ordinarily sits at a desk which is affected by variables such as sunshine level, drafts from opening of doors, variations in natural air currents throughout the office, etc. As a result, the office worker may find that sometimes the work-space is uncomfortably cool while at other times it is unpleasantly warm, although the air conditioner is actually holding uniform air temperature in it's immediate thermal zone. In such an arrangement the office worker, short of moving his or her workspace, has two apparent options: that of re-setting the temperature control on the air conditioner's control panel from time-to-time or enduring the random variations, albeit unpleasant. A clear problem with this technique, aside from being in principle unpredictable and inherently having a considerable time-lag in any meaningful response, is that re-setting the controls is hard to estimate and therefore a continual overshoot or undershoot of the workspace temperature may occur with the result that the desired level of workspace comfort is never maintained for any reasonable period of time. As a result worker productivity suffers due to distraction, frustration and annoyance with the marginal comfort level. Illness from cold symptoms and loss of worker productive time may also introduce economic loss.

Window mounted room air conditioners are frequently used in homes to cool peopled living space. As a result, the air space surrounding a chair or sofa occupied by a person may become uncomfortable due to non-uniform cooling air distribution within the living space. Although the air conditioner may be performing properly (in a technical sense) in maintaining a constancy of chilling of the air passing through its air ducts, this does not assure that a comfort zone is maintained in a more distant part of the living space. As a result, an occupant may experience excessive or insufficient cooling in the actual portion of the room which is occupied. This condition is further aggrieved by ordinary changes in ambient conditions in the room, e.g. presence of additional heat sources such as sunlight, additional persons, entertainment equipment, lamps, etc. all of which may normally be expected to vary from time to time.

Space heaters are afflicted with operational problems similar to air conditioners in that the source of heat may be placed at a substantial distance from a user's workspace and numerous variables can affect the absolute workspace temperature. Ordinary space heaters are seldom equipped with true temperature responsive thermostats but instead they typically utilize a form of "proportional" control (usually in the form of a mechanical thermoswitch) that produce frequent ON and OFF switching with the ratio of ON time relative with OFF time being the control variable. For example, on a maximum setting the heating element may be maintained ON continuously whereas on a minimum setting the heating element may repeatedly cycle ON for 1–2 seconds and OFF for 10–20 seconds. It is obviously difficult to estimate the proper setting for the heater in order to maintain the workspace near a optimal comfort level temperature. Control becomes even more difficult in a heated space which is subject to external variations, such as drafts and periodic opening of doorways.

ENERGY CONSERVING ASPECTS

Energy conservation is desired (if not required) in modern heating and cooling systems. Energy costs are high, but also an environmental issue of reducing unnecessary fuel waste is of concern in most contemporary installations. Aside from not being "politically correct", unnecessary waste of fossil fuel or electricity is frequently an issue requiring reduction under law or mandate. For example, modern room air conditioners are required to achieve ever-higher efficiency ratings. But to merely install a new, higher efficiency room air conditioner may not achieve the fundamental spirit of improved operating efficiency because the actual indirectly introduced losses (external to the air conditioning machinery) are overlooked. Losses caused by ineffective regulation of workspace or living space temperature can far outstrip any gains a new "higher efficiency" air conditioner can possibly contribute to reducing overall energy consumption. A surprise frequently accompanies the replacement of an older air conditioner with a "better" (e.g., higher efficiency) air conditioner in that the actual electrical consumption as reflected in the monthly billing seems to show little if any beneficial change. Why this occurs is that the remote location of a room air conditioner, or for that matter a space heater, from the actual work or living space introduces a variety of variables which overwhelm the attempted thermal regulation of even the best air conditioner or space heater which depends solely upon its built-in thermostat for control. A particular issue is that of creating a level of apparent in-situ comfort for the person working or living within the space serviced by the air conditioner or space heater. It is the ability of my invention to achieve remote temperature control feedback to the air conditioner directly from the person's working or living space by a portable thermostat which brings about energy savings which may reduce energy consumption while maintaining an acceptable level of personal comfort for the user.

In particular, my invention saves energy through the expedient of reflecting most directly the temperature of the occupied space immediately proximate with habitation. As a result, any tendency for severe overshoot of heating or cooling is minimized. The wasteful practice of opening windows or otherwise compensating over-cooling or over-heating is greatly reduced, if not done away with, with obvious energy conservation benefits.

OBJECT OF MY INVENTION

Both heating and cooling systems benefit from my invention. In particular "room" air conditioners and portable space heaters may benefit the most.

It is therefore an object of my invention to provide wireless remote in-situ control of a room air conditioner by a portable thermostat locatable near a person occupying the air conditioned room.

Another object of my invention is to enable the occupant to readily move the portable thermostat to any of various locations within the room to thereby best achieve climate control of the ambient air temperature near the person.

A further object of my invention is to provide a centrally situated climate control system, such as a room air conditioner, with a wireless remote control provision whereby a portable thermostat may be moved about within a room, office or other enclosed space in order to obtain the most satisfactory ambient air temperature in the immediate vicinity of an occupant.

Yet another object of my invention is to override usual integral room air conditioner and space heater temperature control apparatus with a local, moveable thermostat which may be conveniently repositioned or moved about in-situ to suit the needs of a person using the room.

Still another object for my invention is to teach how comfort may be improved upon in an occupied area through remote control of a climate control system such as a window air conditioner or space heater by a portable and readily movable thermostat located within the occupied area.

A still further object for my invention is to provide an ordinary air conditioner or space heater with a supplementary comfort control arrangement whereby operation may be locally determined by a moveable, wireless, and remotely locatable thermostat that can be moved about anywhere within the room to suit the particular preferences of a room occupant.

Yet a further object for my invention is to show a wireless remote control portable thermostat arrangement whereby operation provided by the remotely located portable thermostat supplements and generally over-rides any conventional (e.g., built-in) thermostat or similar arrangement ordinarily incorporated into the cooling or heating device while providing that safe operational limits are established by the original or built-in cooling or heating system temperature control in order to prevent excessive excursion of room temperature in event of removal, intentional disablement or failure of the wireless remotely controlled portable thermostat.

These and other objects, intents and purpose for my invention will unequivocally reveal themselves to an astute skilled artisan through the following summary, description, drawings and appended claims relating to the fundamental essence of my invention.

SUMMARY OF MY INVENTION

My invention provides local area wireless remote control of a distant source of heating or air conditioning in an office, room or other occupied space. Recognizing that in prior art, temperature control is ofttimes achieved by a thermostat mounted integral with an air conditioner, it becomes immediately apparent that uniform air control throughout a heated or cooled area is in fact difficult, if not impossible, to achieve. In practice, areas often become over-heated or over-cooled in a nearly futile attempt to obtain comfort level near the room occupant. For example, if 72 degrees Fahrenheit is deemed to be a good comfort level, some portions of a controlled space may far exceed 75 degrees while other areas may fall to less than 68 degrees. Natural air current distribution throughout a controlled room can easily produce such temperature gradients or variations. In particular, portable "room size" air conditioners (and window mounted air conditioners in particular) have an inherent technical difficulty in maintaining any reasonable semblance of uniform air cooling throughout an entire living space or office. They are beset with at least two principal shortfalls:

a) a room air conditioner is a singular and localized source of cooling air; and, b) a temperature control (e.g., thermostat) for the room air conditioner is ordinarily mounted integral with the air conditioning machine and therefore it does not obtain a true measure of resulting ambient air temperature in another (more distant) part of the cooled space.

Several operating scenarios may be described which attest to a failure of prior temperature control systems in maintaining the immediate temperature of an office or living space at a suitable comfort level for a person occupying the tempered space.

An office (and in particular an individual office having a single occupant) may often be found to be very uncomfortable for the occupying person and as a result lower the effective work efficiency of that person. My invention now provides the same person with a portable thermostat which, for example, can be set directly upon a desk near the person. A setting may be made by the office worker which best suits his or her personal comfort level and wireless signals transmitted between the portable thermostat and a controller separately coupled with or integral with the air conditioner or heater may regulate the tempered air to such an extent that the chosen temperature is closely maintained in the immediate space occupied by the person.

In a home setting, persons who may sit in a particular area such as a "family room" or living room typically gather in one portion of the room which may be remote from the source of cooling or heating. Again imagine having a portable thermostat which may be placed near this gathering and set to a suitable comfort level. As a result, ambient air temperature proximate with the gathering is kept constant and comfortable irrespective of whatever changes may occur in other portions of the room. Additionally, such a portable remote control thermostat might have at least two presettable temperatures representing a lower and higher temperature, typically a few degrees apart. Under this circumstance, when the people first gather in the room, the lower setting may serve to control the ambient temperature near the gathering. But as time passes, the temperature may gradually increase in increments or steps to the higher temperature. In effect this graduated change in temperature offsets the cool-off feeling sometimes encountered by persons who have settled down, for example to watch television. As a result their metabolism slows and they may inherently feel cooler. The gradual increase in temperature (e.g., less air conditioning or more heating) in the immediate living space substantially enhances the apparent comfort level for any occupants.

A similar effect may be sought in a bedroom setting. The portable thermostat that is embodied by my invention may be set next to a bed to enable comfortable control of room temperature for a retiring person. The room may be initially cooled to a comfortable level when first going to bed while the dynamics of the body are still stirred up to such an extent so as to produce considerable metabolic heat. Then as sleep occurs and the body drifts into a slowed metabolic state, the air conditioning in the bedroom is lessened to allow some warming-up of the room to avoid chilling of the sleeper and possibility for catching a cold, etc.

As is obvious from the foregoing paragraphs, my invention not only maintains a constant comfort level in the general area of a room which may be immediately occupied, but it may also readjust or compensate the temperature relative with passage of time to regulate the immediate temperature to that of a more comfortable or healthful level regardless of the less precise settings of an effectually distant "main thermostat" which, for example, might be integrated into an air conditioning machine.

OPERATION WITH AIR CONDITIONING

Air conditioning can benefit from my invention by enabling almost immediate re-adjustment of the extent of air conditioning demand by changes in the living space (or desired comfort zone) serviced by the air conditioner. Sometimes this means that the air conditioning level may increase while at other times the extent of air conditioning demand may decrease. Common window and through-the-wall air conditioners (unitized air conditioners) typically fail to sense the temperature of the ambient air temperature of the space they service at any substantial distance from their location. In other words, they maintain the coolness level in their immediate proximity. This occurs primarily because typical unit air conditioners merely have an integral temperature sensor 32 mounted at their flow-through air duct and as a result they simply cycle the compressor on and off to attain a medial temperature over an extended period of time. Integral controls which are commonly used to do this may include, for example, a Ranco model A30-X450 (-X451,-X452) sensor.

Unit air conditioners may be more efficiently utilized by providing remote regulation of their operation by use of the novel wireless remote control portable thermostat which is central to my invention. In existing installations or with common air conditioning units, a substantial improvement may be made by simply turning the air conditioner on and off in response to signals produced by the wireless remote control portable thermostat. Typically, this might be accomplished by a slave module which plugs-in between the air conditioner and its power receptacle. Such slave power control modules are known, typified by a "X-10 Home Automation" model AM-466.

It is therefore a purpose of my invention to teach how energy might be conserved through more precise localized control of an air conditioner or space heater.

My invention's intent is to utilize electronic circuitry effective as a thermostat that may sense room temperature near an occupant and then send a wireless signal to a receiver that operates a relay to turn an air conditioner or space heater on and off in response to the thermostat settings.

An aspect of my invention is to utilize a wireless coupled remotely locatable portable thermostat to provide operational control of an air conditioner or space heater.

A betterment of my invention involves localized, portable remote control of the operation of a heating or cooling system to achieve better room occupant comfort.

Another intent of my invention is to attain a substantial reduction in energy consumption through limitation of operation of an air conditioner or space heater to merely be that which is necessary to obtain satisfactory spacial temperature regulation of a room in the immediate proximity of an occupant.

Still another betterment of my invention involves usage of wireless remote control of a portable, moveable thermostat which might be placed near a room occupant and therefrom send a wireless signal that may more precisely control operation of an air conditioner or space heater servicing the room.

A further purpose of my invention is to provide a power switching adapter which may be installed between an air conditioner linecord plug and a wall receptacle and which is wirelessly coupled with a remotely located portable thermostat to thereby turn a.c. electric power flow to the air conditioner on and off to achieve temperature regulation.

Still another aspect of my invention is to provide time delay of the controlled air conditioner immediately after the air conditioner has turned-off in order to prevent compressor motor stalling and possible circuit breaker (or fuse) kick-out.

My overall intent for the invention involves a climate control machine usually including an integral thermostat, a portable remote thermostat and a wireless coupling provision between the thermostat and the climate control machine.

Finally, it is an objective of my invention to reduce the amount of energy consumed by heating or cooling of a room by providing localized, more precise regulation of ambient room temperature nearest an occupant of the room irrespective of the remoteness of the heating or cooling system.

It is these and other goals and advantages of my invention which are herewithin described by way of a specification, drawings and claims.

DESCRIPTION OF MY DRAWINGS

My invention is depicted by 9 sheets of drawings including 9 figures:

FIG. 1—Functional diagram of remote wireless thermostat.

Figure 2:
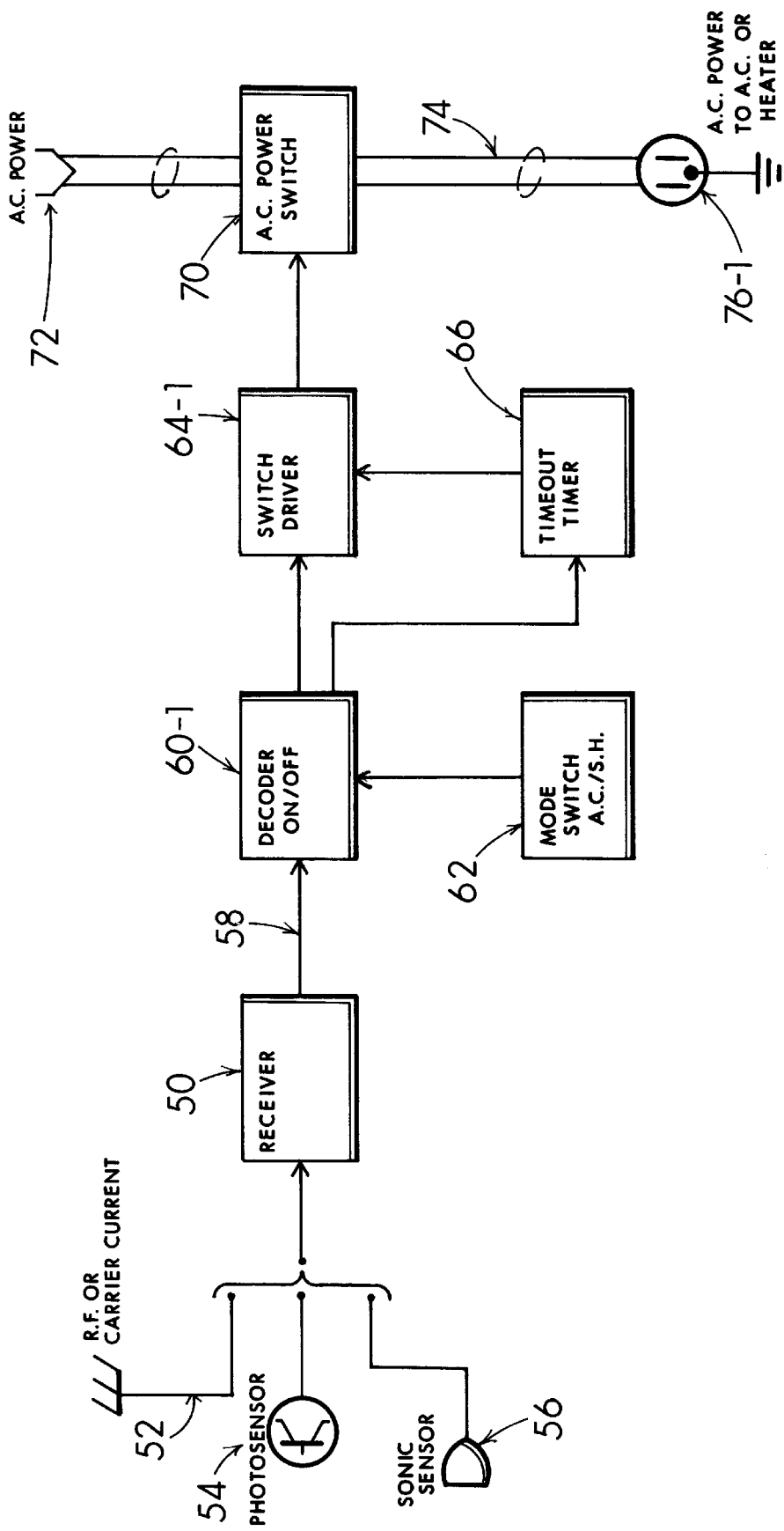

FIG. 2—Functional diagram of master unit receiver and power control for air conditioner or space heater.

Figure 3:
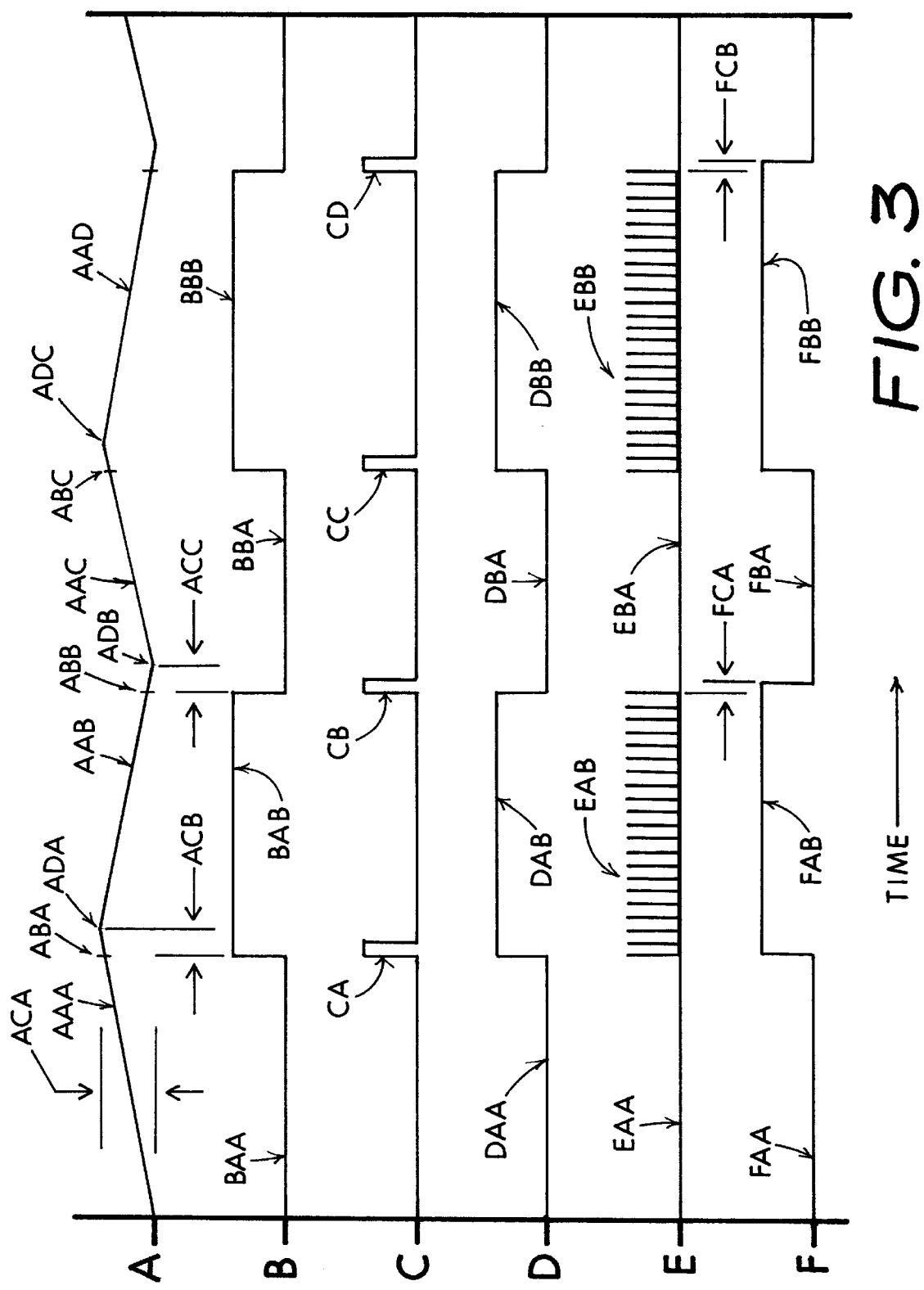

FIG. 3—Timing diagram for various aspects of system.

Figure 4:
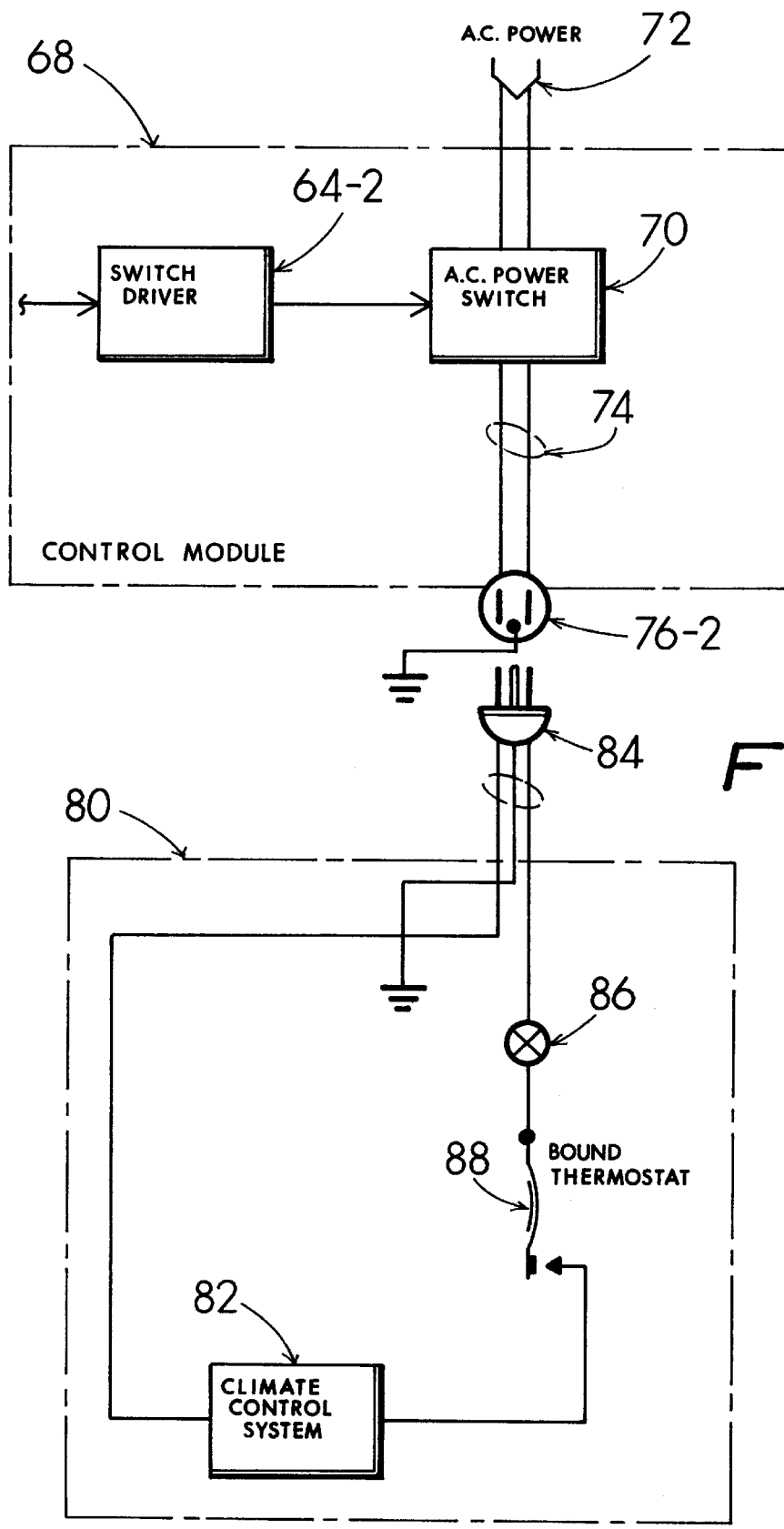

FIG. 4—Coupling between master control module and a climate control system including a bound or limit thermostat.

Figure 5:
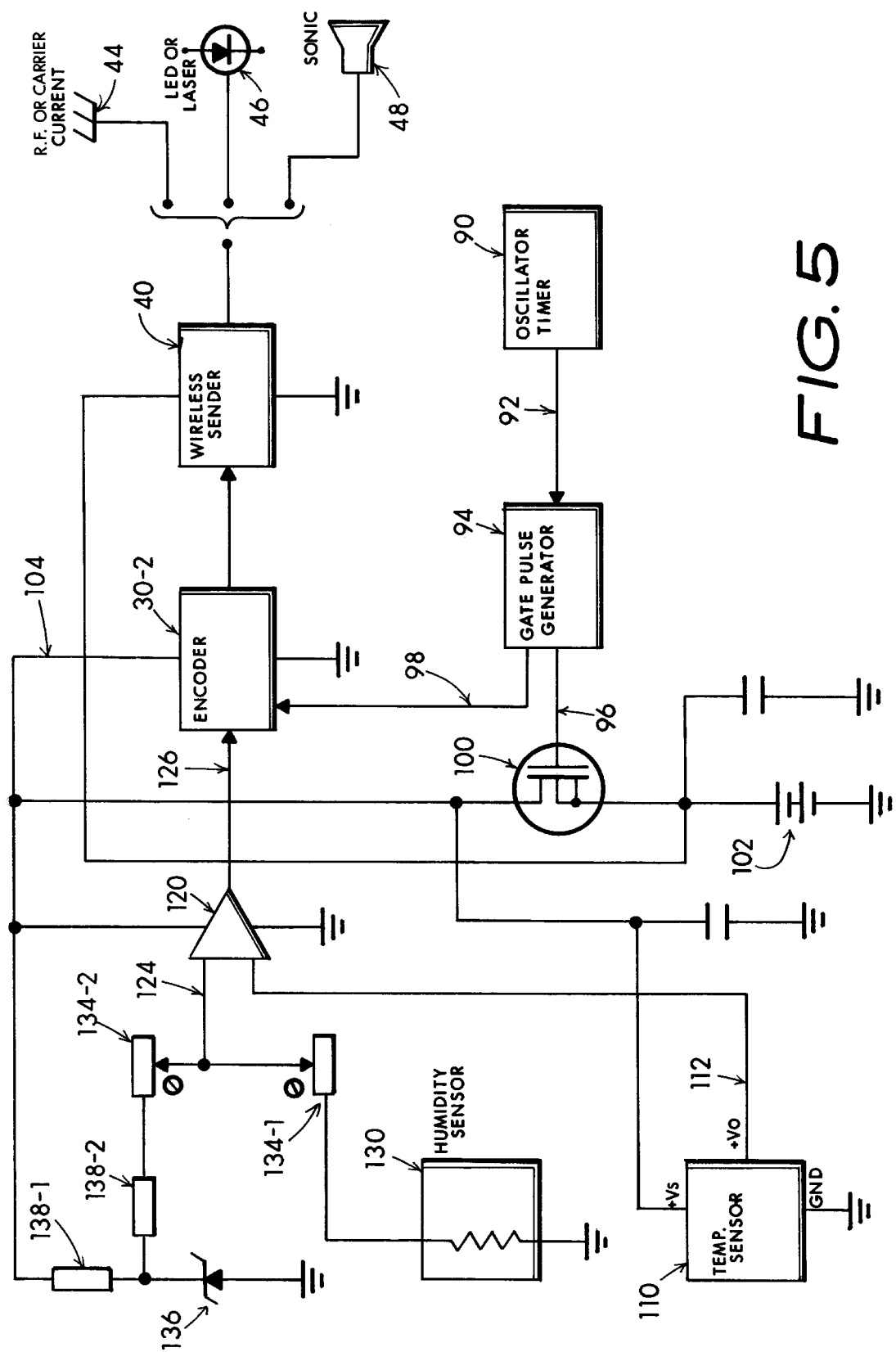

FIG. 5—Remote thermostat including humidity sensor compensation of temperature.

Figure 6:
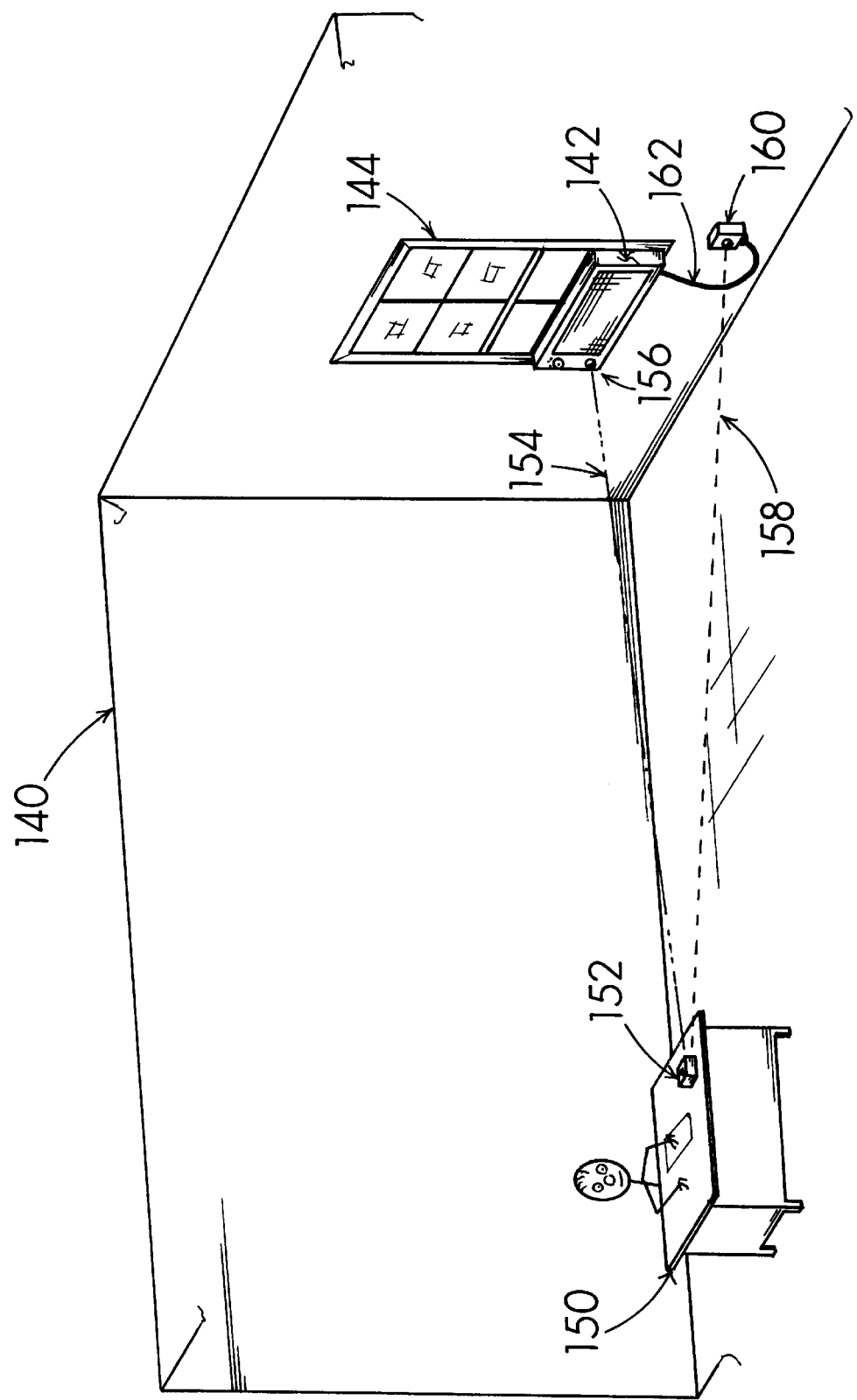

FIG. 6—Room scale depiction of remote thermostat operating with a master control for an air conditioner.

Figure 7:
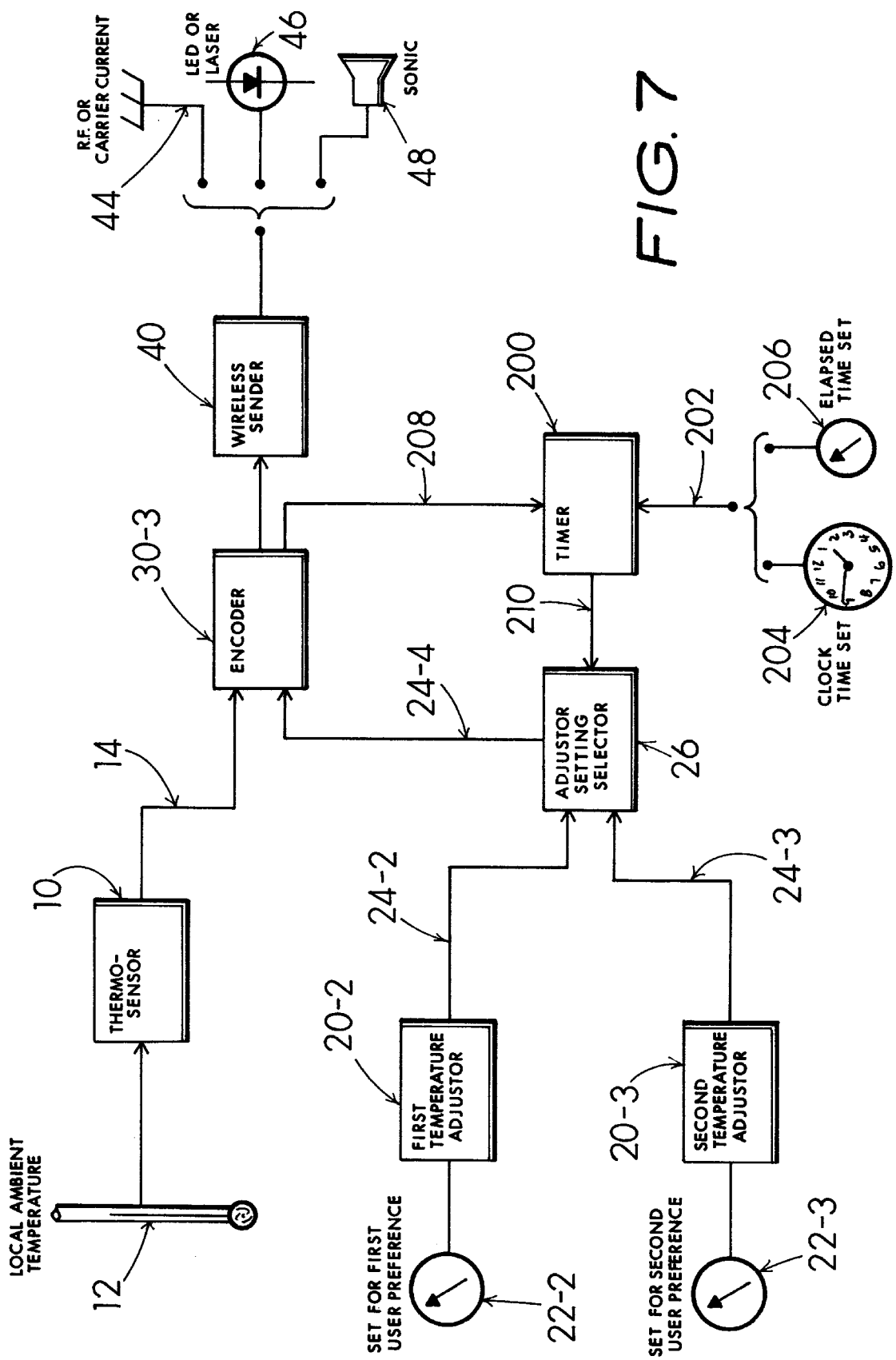

FIG. 7—Remote thermostat including two user presets for temperature which are selected upon elapse of a predetermined period of time.

Figure 8:
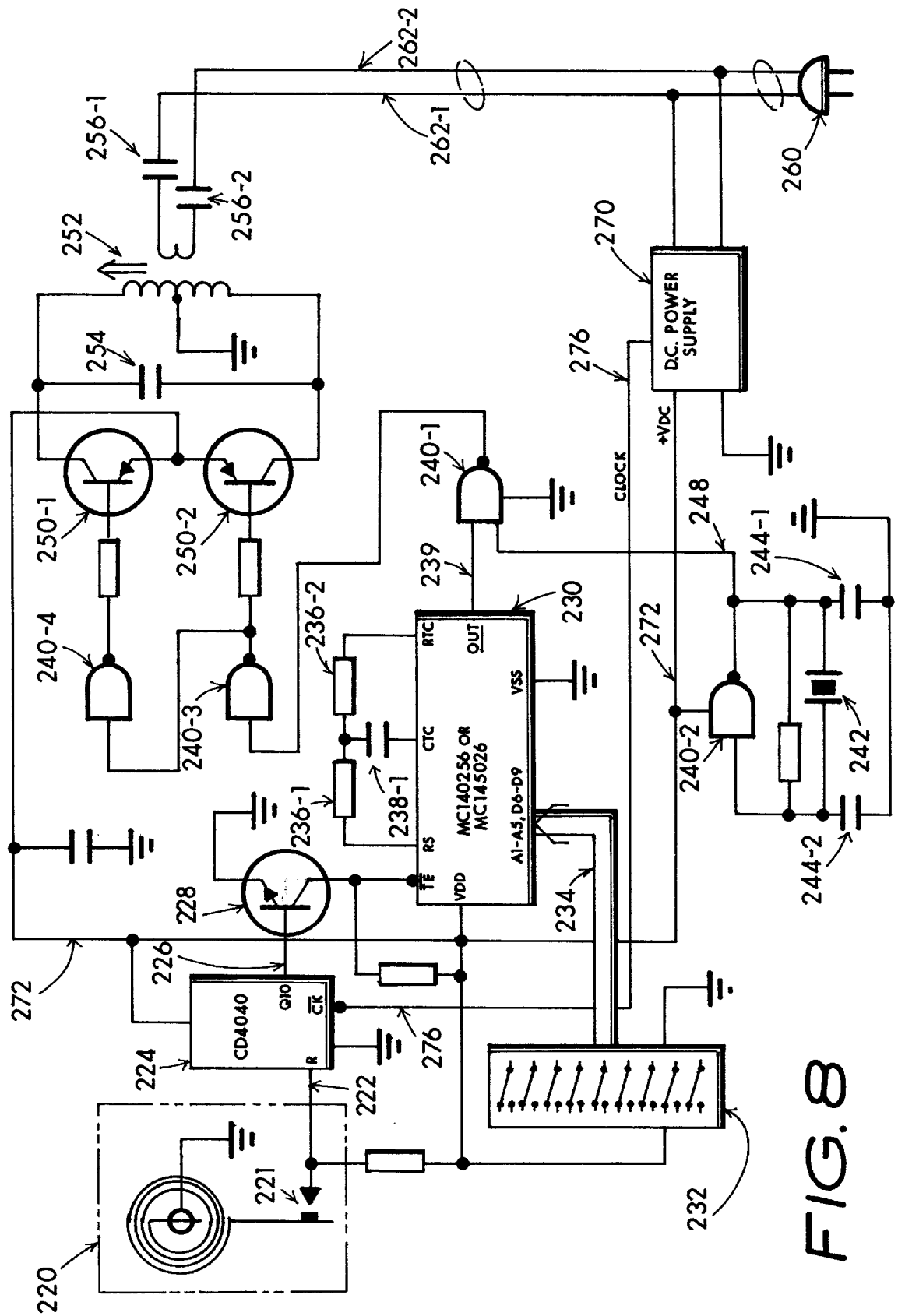

FIG. 8—Diagram for a remote carrier current operated controller embodiment.

DESCRIPTION OF MY INVENTION

In FIG. 1 I generally show 1 a portable remote thermostat including a thermosensor 10 which responds to local ambient temperature 12 immediate with and surrounding the thermostat. In other words, if the remote thermostat apparatus is portably placed upon a table or desk near an occupant of the room, the temperature to which the thermosensor responds is very nearly that of the space which is occupied. A signal 14 is produced which relates to the sensed level. The occupant or user may operate a temperature adjustor 20-1 using an adjustment 22-1 (such as a knob device). As a result, a signal is delivered on line 24-1 which reflects this user setting. An encoder 30-1 compares the values of the thermosensor signal on line 14 with the temperature adjustor signal on line 24-1. Two state levels of signal may occur at the output of the encoder 30-1, on line 32. For example, a first state level signal might be indicative that the signal on line 14 exceeds that of line 24-1. Conversely, a second state level signal may alternatively indicate that the user preset signal on line 24-1 exceeds that of line 14. FIG. 3 depicts a variation in temperature A which might surround the portable thermostat. The variation is shown as an increasing level AAA,AAC and decreasing level AAB,AAD in response to efforts of the climate control system. A small hysteresis ACA appears which is normal and often preferred in operation of a climate control system. Ordinarily the change between level ADA and ADB is several degrees. When a level ABA is reached, the comparative signal through the encoder (which may appear on line 32) changes in waveform B from a low level BAA to a high level BAB. The higher level BAB returns to a lower level BBA upon a falloff of the temperature AAB to a level ABB whereupon the temperature (after a minor lag ACB, ACC due to system dynamics) again increases AAC until a level ABC is reached and the low level BBA once again changes to a high level BBB. The signal on line 32 may manifest itself in several forms, as shown by waveforms C,D,E of FIG. 3. In waveform C, a pulse CA,CC is produced when the signal B changes from a low level to a high level; correspondingly a pulse CB,CD occurs when the signal B changes from a high level to a low level. In my preferred embodiment, using this signal format of waveform C, each the waveforms CA,CC are encoded to he uniquely different from the waveforms CB,CD. One code serves to mean "on", while the other is the "off" code. In this mode, a uniquely coded pulse is sent via the wireless link whenever the climate control system needs to change its operating state from a first level to a second level of performance (usually on and off). Alternatively and as shown by waveform D, one of the levels DAA,DBA is maintained off or better, uniquely encoded with an "off" code, while the other level DAB,DBB is maintained and uniquely encoded "on". In this mode, continuous wireless transmission occurs between the remote thermostat and the master control receiver device. A third mode shown by waveform E overcomes shortcomings of the other two modes. For example, in the mode depicted by waveform C the moving of the thermostat causing it to become uncoupled with the master control receiver can result in a failure to turn-on or turn-off the climate control system as needed. In the second mode, continuous operation may become a drawback due to DC power drawn by the wireless sender, particularly when portable battery operation is anticipated. In waveform E I show that the signal on line 32 that serves to modulate the wireless sender 40 is a succession of short duration pulse signals. Each pulse signal is encoded, but the average power of the pulse signal train is far less than the continuous power level necessitated by waveform D. In any event, the state level signal on line 32 serves to modulate or key a wireless sender 40, producing a "wireless" signal on line 42 which may drive an antenna 44, a light emitting diode (L.E.D.) or laser diode 46, or a sonic (or ultrasonic) transducer 48. In the context of my invention, the wireless antenna signal is ordinarily a radio frequency signal which may operate in the UHF band (e.g., about 900 MHZ) or a carrier current signal wherein the usual building wiring becomes a virtual antenna or radio frequency transmission medium, usually operating between 50 to 500 kilohertz. The wireless portion of my invention may include specialized encoding schemes and wireless coupling techniques similar to those which are already well known in the field of wireless remote power control (home automation) devices, such as a model 6313 controller from Leviton Manufacturing Corp., or a model MC460 produced by X-10 Corp.

A master control module is depicted in FIG. 2 that operates in conjunction with the wireless signal produced by my remote thermostat controller of FIG. 1. A receiver 50 accepts a signal derived from an antenna 52 (which might include a capacitive coupling with the buildings power wiring to effect carrier current intercoupling), a photosensor 54 (such as a photodiode or phototransistor), or a sonic sensor 56. The received signal on line 58 couples with a decoder 60-1 that, in its primary form serves to respond to the uniquely coded wireless signal waveform and deliver an ON/OFF signal to a switch driver 64-1 which couples with an AC power switch 70. The signal delivered by the switch driver 64-1 might be a suitable trigger pulse signal which can drive a thyristor such as a triac operating as the AC power switch 70. Alternatively, the switch driver 64-1 may deliver a signal which can activate the coil of a relay used as the AC power switch 70. In any event, use of a thyristor or relay is merely an engineering choice which may be decided from well know art by a practitioner of my invention. The state level of the received wireless signal determines the operating state of the AC power switch 70, whereby when the AC power switch is ON (or "closed"), AAC power 72 is coupled with an outlet 76-1 connection which may therefrom flow to an ordinary air conditioner or space heater.

A mode switch 62 is shown as an optional control which enables selection of Air Conditioning (A/C) or Space Heating (S/H) mode, if necessary. This switch may serve to merely reverse the effective action of my invention:

| RECEIVED SIGNAL | MODE SWITCH | AC POWER FLOW |
| --- | --- | --- |
| First Level | A/C | ON |
| Second Level | A/C | OFF |
| First Level | S/H | OFF |
| Second Level | S/H | ON |

A timeout timer 66 is also shown to provide a safety factor to shut down operation of my invention in absence of wireless signals modulated by the encoded waveform E of FIG. 3. A lapse of pulses EAB,EBB produces "timeout" of the timer and disablement of the switch driver 64-1 and stoppage of power flow through the AC power switch 70. Operating in this mode, failure of the pulses EAB,EBB due to interruption or intentional shutoff of the pulses FAA,EBA results in a timeout and shutdown of the power switch 70 that is slightly delayed as shown in waveform F by the "delay" depicted by FCA,FCB. As a result, the air conditioner (or space heater) turns off FAA,FBA and on FAB,FBB in response to the signals E.

In FIG. 4 I show a control module 68 similar to that of FIG. 2 in which the switch driver 64-2 operates the AC power switch 70 that couples AC power 72 from a source through the switch and line 74 that supplies a receptacle 76-2. This control module is conceived similar to the embodiments provided by others, such as the Leviton Manufacturing Co. model 6296 and X-10 Home Automation model AR466. In other words, it is a self contained module which plugs into a standard wall outlet and includes a receptacle into which an air conditioner or portable space heater may be plugged. When apparatus such as an air conditioner 80 is plugged 84 into the control module, AC power flows through a switch 86 and a bound thermostat 88 to the climate control system 82 (such as a compressor, etc.). What I call the bound thermostat 88 is similar to the ordinary thermostat built into most portable air conditioners of the through the window mount design. In this automatic, remote controlled arrangement for the air conditioner, it is the primary purpose of the bound thermostat to shut-off the air conditioner in absence of a shut-off by the control module if the air temperature near the bound thermostat drops below the bound temperature which may ordinarily be preset by the user. With air conditioning, the bound temperature is set below the desired room temperature to shut the air conditioner off in event of remote control lapse, thereby preventing over-chilling of the room. With space heating, the bound temperature is set above the desired room temperature to shut off the space heater in event of remote control lapse, thereby preventing overheating of the room.

A functional schematic for a remote thermostat sender appears in FIG. 5 to include temperature compensation relative with changes in relative humidity. For example, with air conditioning, as the humidity decreases the cooled temperature may be incrementally increased to maintain a constant level of apparent comfort. DC power from a battery 102 may couple through a MOS-FET transistor switch 100 to deliver DC power on line 104. An oscillator timer produces a train of short duration pulses similar to those shown in FIG. 3 as waveform EAB,EBB that couple through the gate pulse generator 94 with the base lead 96 of the MOS-FET 100. The resulting pulses produce pulsation of the DC Level on line 104 which couples through resistors 138-1,138-2 to the seriesed rheostats 134-1,134-2 and to the humidity sensor 130. A characteristic of the humidity sensor is to change impedance (resistance) with ambient moisture. As a result, the signal voltage on line 124 as stabilized by a zener 136 is caused to vary in proportion to humidity changes. A temperature sensor 110, in this case a National Semiconductor Corp. type LM-50C, serves to detect ambient temperature T (in Centigrade) surrounding the portable thermostat device and produces at signal TSIG on line 112 equivalent to:

$$TSIG=((10\ mv \times T)/1000)+0.5=Volts.$$

Line 124 couples with a first input of a comparator 120 while the TSIG signal couples with the other comparator input 122. The result is an output from the encoder 30-2 which has a "first level" and a "second level" value of coded signal that couples with the wireless sender 40. A gating signal on line 98 derived from the gate pulse generator 94 serves to enable and disable the encoder 30-2 in synchronization with the gated DC level on line 104 in order to prevent false code signals from being developed.

A room or office arrangement 140 which associates operation of my invention appears in FIG. 6. An air conditioner 142 mounts through a window 144 to provide cooling of the room. An occupant of a desk 150 is situated far from the air conditioner, which may previously result in uneven cooling effect with the air nearest the air conditioner typically being better regulated than that near the occupant. To overcome this uneven cooling effect, my invention now provides a portable thermostat device 152 which is placed near the occupant. In one form for my invention, a wireless coupling (depicted by the broken line 154) couples with a receiver 156 integral with the air conditioner that may function to at least turn the air conditioner's cooling function on and off in response to ambient temperature conditions sensed near the occupant by the portable thermostat 152. In yet another mode for practice of my invention the wireless coupling (depicted by the broken line 158) couples with a master control module 160 that typically plugs into a wall outlet. The power cord 162 from the air conditioner 142 subsequently plugs into the controller module 160. This latter arrangement permits operation of my invention's remote temperature control with an ordinary air conditioner. The climate control device might also be a heat pump (e.g., General Electric AZ31H12D3C) or a space heater (e.g., Slant/Fin model AQR-1500), operated in a similar manner to that which I specifically depict for an air conditioner 142.

Two different locally determinable temperature choices may be determined by a room occupant in my invention's arrangement of FIG. 7. A first temperature adjustor 20-2 and may be set for a first preference level 22-2, with the output line 24-2 coupled to an input of the adjustor setting selector 26. Similarly, a second temperature adjustor 20-3 may be set for a second preference level 22-3 with the output line 24-3 coupled to another input of the adjustor setting selector 26. Whichever of the signal lines 24-2,24-3 is selected is coupled via line 24-4 with the encoder 30-3. Selection is determined by a timer 200, which produces a selection signal on line 210 that is determined by either a specific clock settable time (time-of-day setting) 204, or by elapse of a presettable period of time 206.

A remote thermostat is shown in FIG. 8 including a bimetal thermostat mechanism 220 including contacts 221 which, for room cooling application, CLOSE when the ambient temperature rises to a level where the air conditioner should start running. Closure of the switch contacts 221 pulls the level on line 222 LOW, enabling the binary counter 224. The counter is clocked with 60 Hz (or 50 Hz) pulses and about 8.5 seconds (10.24 seconds for 50 Hz) elapse whereupon the Q10 output line 226 goes HIGH and couples through a transistor 228 to deliver a LOW level signal to the /TE input 229 of a Motorola MC145026 CMOS encoder device. An array of switches or jumpers 232 provides a ENCODER PRESET signal 234 coupled with the A1–A9 inputs of the encoder, thereby setting a unique code for the individual system in which this thermostat is employed and overcoming problems of cross-interference or interaction between other remote thermostats in the same building. Resistors 236-1,236-2 and capacitor 238-1 provide time constants for the encoder's internal oscillator, operating typically about 5–10 Hz. The encoded signal delivered from the OUT encoder on line 239 couples with an input of a NAND gate 240-1. NAND gate 240-2, together with a frequency determining crystal 242 and capacitors 244-1, 244-2 delivers a radio frequency signal on line 248 that couples with the other input of the NAND gate 240-1. The NAND gate is enabled by pulses from the encoder on line 239 and results in a train of radio frequency signal pulses which couple through a buffer 240-3 to the base of a PNP transistor 250-1. The buffer output also couples with a second inverting buffer 240-4 that couples with the other PNP transistor 250-2. Thus the transistors form a push-pull output stage that couples with an RF transformer 252 including resonating capacitor 254. The RF output from the transformer is isolated by capacitors 256-1,256-2 feeding RF carrier current signal into the AC line 262-1,262-2 that feeds from the AC power source through plug 260. DC power is derived from the AC power source through DC power supply 270, providing a positive DC level 272 for circuitry operation. A tap-off of 60 Hz (or 50 Hz) signal derived from the AC power source is also provided on line 276 to couple with the aforementioned counter 224 /CK input.

Although I teach several forms for my invention as depicted in the accompanying figures and description, this by no means shall be construed as limiting the scope of my invention to these particular combination of elements or structural configurations. It is the utter essence of my invention to teach a portable remote sensing and wireless coupled comfort system thermostat control method and to give example of practical apparatus suitable for embodiment of the portable remote thermostat method which is suitable for use with air conditioners and space heaters. It is necessary to realize that the remotely placed thermostat apparatus might take other portable forms engineered to suit a particular application, design preferences of a particular maker or user, or to take advantage of specific technological parts or techniques without departing from the underlying spirit of my invention. It is also necessary that when I give specific operating conditions for the representative operation of sensors and control circuitry associated with my apparatus or when I call for particular component values these definitions of temperature or other operational values are mere guidelines which serve to example the art which I have developed to others but should not be construed as limiting or regulatory regarding the operative essence of my invention. At most, they shall be understood as being operating conditions and other values which I have found representatively suitable in several forms of my invention which are useful with my wireless remote comfort system control. I anticipate that mere variations of this invention may be implemented by other artisans or engineers which can adapt it to apparatus designs of a particular maker or user.

It shall be understood that whatever choice of components, component values, thermal sensors, power sources, circuit connections, physical embodiment, electrical operating levels,

What I claim is:

1. A supplementary temperature control method providing for a localized zone control of an ambient room temperature produced by an unitary air conditioning system equipped with an integral temperature control thermostat, comprising steps of:

setting the integral temperature control thermostat to a first bound temperature as an operational limit;

placing a physically unconstrained portable thermosensor in an occupant determinable local zone location within a usually remote portion of a room relative with the unitary air conditioning system and usually proximate with the occupant;

first presetting a first temperature response threshold level for the portable thermosensor;

sensing local zone ambient temperature in the occupant determined said local zone location;

sending a first encoded wireless control signal when change in the sensed local zone temperature increases above the first temperature response threshold level;

remotely receiving the encoded said wireless control signal;

sourcing a.c. electric power through an electric receptacle device;

fitting the unitary air conditioning system with an electric cord and electric plug device;

interjoining the electric plug device, an electric switching device and the electric receptacle device;

turning-ON the electric switching device in automatic response to the remotely received said wireless control signal to admit a flow of the a.c. electric power between the electric receptacle device and the electric plug device; and, thereby modulating operation of the unitary air conditioning system to produce a a cooling of the ambient local zone temperature in response to the remotely received said encoded wireless control signal.

2. The supplementary temperature control method of claim 1 comprising the further step of sending a second encoded wireless control signal when the change in the sensed local zone temperature decreases below the first temperature response threshold level;

said remotely receiving the second encoded wireless control signal;

turning-OFF the electric switching device in automatic response to the remotely received said wireless control signal to inhibit the flow of the a.c. electric power between the electric receptacle device and the electric plug device; and, thereby stanch a further cooling of the ambient local zone temperature in response to the second encoded said remotely received said wireless control signal.

3. The supplementary temperature control method of claim 1 comprising the further steps of:

presetting the minimum limit temperature usually set by the integral temperature control thermostat to a first bound temperature level for the air conditioning system, to take effect as a safeguard in absence of said remote reception of the wireless control signal; and, limiting operation of the unitary air conditioning system through a safeguard response of the integral temperature control thermostat to the first bound temperature level thereby maintaining the ambient room temperature proximate with the unitary air conditioning system about the first bound temperature level.

4. The supplementary temperature control method of claim 1 comprising the further steps of:

sensing ambient humidity level proximate with the portable thermosensor; and, compensating an effective value for at least the first temperature response threshold level in a predetermined proportion relative with change in level of the sensed ambient humidity.

5. The supplementary temperature control method of claim 1 comprising the further steps of:

measuring elapse of time;

second presetting a second temperature response threshold level for the portable thermosensor of usually less than ten degrees Fahrenheit offset relative with the first temperature response level; and, shifting a third temperature response threshold level between that of the first temperature response level and the second temperature response level to occur during the measured elapse of time; and, redefining the sending of the first encoded wireless control signal to occur when the change in the sensed local zone temperature increases above the third temperature response threshold level.

6. The supplementary temperature control method of claim 2 comprising the further step of:

clocking elapse of time-of-day;

entering a first time-of-day setting;

entering a second time-of-day setting;

defining a first interval of time occurring between the clocked elapse of the first time-of-day setting and the second time-of-day setting;

defining a second interval of time occurring between the clocked elapse of the second time-of-day setting and the first time-of-day setting;

second presetting a second temperature response threshold level for the portable thermosensor of usually less than ten degrees Fahrenheit offset relative with the first temperature response level; and, said sending the first encoded wireless control signal during the first interval of time when the sensed local zone temperature increases above the first temperature response threshold level;

said sending the first encoded wireless control signal during the second interval of time when the sensed local zone temperature increases above the second temperature response level;

said sending the second encoded wireless control signal when the change in the sensed local zone temperature decreases below the first temperature response level during the first interval of time; and said sending the second encoded wireless control signal when the change in the sensed local zone temperature decreases below the second temperature response level during the second interval of time.

7. A remote temperature management method for an unitary air conditioning system equipped with an integral temperature control thermostat and comprising steps of:

setting the integral temperature control thermostat to a first bound temperature for predetermining a minimum level of cooling temperature limit;

placing a substantially unconstrained portable wireless thermostat within a climate controlled room to be local zone ambient room temperature responsive;

first determining a first preferred level for the local zone ambient room temperature surrounding a room occupant;

first entering a first setting for the portable wireless thermostat to establish the first preferred level as a first desired temperature threshold;

sending a first encoded wireless control signal in response to the local zone ambient temperature increasing above the first desired temperature threshold;

receiving the first encoded wireless control signal by an a.c. electric power controller;

turning ON an a.c. electric power flow through the a.c. electric power controller in response to the fit encoded wireless control signal sent by the portable wireless thermostats;

turning OFF the a.c. electric power flow in a determined absence of the first encoded wireless control signal;

interjoining the a.c. electric power controller between a source of a.c. electric power and a power input terminal portion of the unitary air conditioning system;

modulating the unitary air conditioning system operation through an alternation the ON and OFF flow of a.c. electric power determined by the a.c. electric power controller;

thereby enabling a localized control of the local zone ambient room temperature surrounding the portable wireless thermostat.

8. The remote temperature management method of claim 7 further comprising:

sending a periodically recurrent said first encoded wireless control signal when sensed change in the local zone ambient air temperature at least firstly traverses and remains above the first desired temperature threshold and usually sending a periodically recurrent said second encoded wireless control signal when sensed change in the ambient temperature at least secondly traverses and remains below the first desired temperature threshold;

said remotely receiving the encoded wireless control signal;

modulating the overall flow of a.c. electric power flow through the a.c. electric power controller and coupled with the unitary air conditioning system to turn ON in response to the periodically sent said first encoded wireless control signal and to turn OFF in response to the periodically sent said second encoded wireless control signal and to turn OFF in absence of the first encoded wireless control signal subsequent to elapse of a predetermined period of time.

9. The remote temperature management method of claim 7 further comprising steps of:

timing an elapse of a predetermined interval of time between about 5 and 120 minutes;

second determining a second preferred level for an alternate local zone ambient room temperature surrounding the room occupant redetermining the first desired temperature threshold to respond to the alternate local zone ambient room temperature setting in response to the elapse of the predetermined interval of time.

10. The remote temperature management method of claim 7 comprising further steps of:

clocking a timer to incrementally change an effective level of the preset said local zone ambient room temperature by several thermal degrees; and, redetermining an alternate and usually warmer said local zone ambient room temperature setting in response to the timer clocking.

11. The remote temperature management method of claim 7 comprising further steps of:

sensing relative humidity proximate with the wireless thermostat; and, redetermining an effective level of the preset said local zone ambient room temperature to modify the first desired temperature threshold proportional to the sensed change in immediate level of local zone relative humidity.

12. The remote temperature management method of claim 7 comprising a further step of:

determining the turn OFF of said a.c. electric power to exceed a first interval said turning OFF the a.c. electric power flow;

determining onset of an elapse of a postliminal time interval commencing with the turning of of the a.c. electric power flow delaying the turning ON of the a.c. electric power flow through the a.c. electric power controller in response to the remote reception of the first state level said encoded wireless control signal subsequent to an elapse of the postliminal time interval.

13. The remote temperature management method of claim 7 comprising further steps of:

timing elapse of a first interval of time subsequent to the turn OFF of said a.c. electric power through the a.c. electric power controller;

delaying the first encoded wireless signal's said turn ON of the a.c. electric power flow prior to the timed elapse of the first interval of time; and enabling the delayed said turn ON of the a.c. electric power flow subsequent to the timed elapse of the first interval of time.

14. The remote temperature management method of claim 7 comprising further steps of:

first intercoupling a first power plug device extensive from the a.c. electric power controller into a first receptacle device coupled with the source of ac. electric power;

equipping the unitary air conditioning system with a second power plug device to provide the power input termination;

second intercoupling the plug device into a second receptacle device seriately coupled between the first power plug device, an a.c. power switching device; and, switching the a.c. power switching device between ON and OFF states in response to the encoded wireless control signal.

15. A unitary air comfort system including an integral thermostat device for presetting a temperature limit in a fixed location zone proximate with the unitary climate control system and comprising:

a source of a.c. electric power;

a portable wireless thermostat apparatus which may be placed at a substantial distance relative with the air comfort system and usually sited near an occupant of a room to encourage a sensing of ambient room temperature in an occupied local zone;

a first temperature threshold setting means maintained by a room occupant;

a first temperature sensor means included in the portable wireless thermostat apparatus which is responsive to the first temperature threshold setting to produce a first thermostatic response signal when the sensed said ambient room temperature exceeds the first temperature threshold setting and produce a second thermostatic response signal when the sensed said ambient room temperature subtends the first temperature threshold setting;

a wireless control signal producing means;

a modulating means for encoding the wireless control signal with at least one of the first thermostatic response signal and the second thermostatic response signal;

a receptor means for remotely receiving the encoded said wireless control signal;

a means for demodulating the encoded said wireless control signal into at least one of the first thermostatic response signal and the second thermostatic response signal; and, a power control means separably coupled between the source of a.c. electric power and a power input terminal means portion of the air comfort system for turning ON a.c. electric power flow to the air comfort system in response to the demodulated said first thermostatic response signal and further enabling at least one of a turning OFF the a.c. electric power flow in response to the demodulated said second thermostatic response signal and the turning OFF the a.c. electric power flow in a determined absence of the demodulated said first thermostatic response signal.

16. The unitary air comfort system of claim 15 further comprising:

a second temperature threshold setting means maintained by the room occupant; and, a timing means effective for changing the adjustable temperature sensor means responsiveness between at least the first temperature threshold setting and the second temperature threshold setting concurrent with an elapse of a predetermined period of time.

17. The unitary air comfort system of claim 15 further comprising:

a second temperature threshold setting means maintained by the room occupant; and, a time-of-day timing means effective for changing the adjustable temperature sensor means responsiveness between at least the first temperature threshold setting and the second temperature threshold setting in response to coincidence between a predetermined time-of-day setting and advancing said time-of-day timing means.

18. The unitary air comfort system of claim 15 further comprising:

a relative humidity sensor means; and, a compensating means effective for redetermining a compensatory variation in the first temperature threshold setting in proportion to a change in a local zone level of relative humidity sensed by the relative humidity sensor means.

19. The power control means of claim 15 further comprising:

a time delay means for delaying the rate at which operation of the unitary air comfort system may be repeatedly alternated between OFF and ON operating level states.

20. The power control means of claim 15 further comprising:

a modular a.c. power switching device which may be coupled between a first receptacle device providing access to the source of a.c. electric power and a first plug device coupled with a power input terminal means portion of the unitary air comfort system;

a power switch means which may switch a flow of a.c. electric power substantially ON and OFF as ordinarily extensive through the modular device and between a second plug means coupled with the first receptacle device and a second receptacle device coupled with the first plug device; and, a switch controller means enabling the ON and OFF said switching of the flow of a.c. electric power through the power switch means in concert with instruction obtained from the remotely received said wireless control signal.

* * * * *